United States Patent [19]

Peterson

[11] Patent Number: 4,884,592
[45] Date of Patent: Dec. 5, 1989

[54] REEL-LESS DISPENSE CONSOLE

[75] Inventor: Richard H. Peterson, Minnetonka, Minn.

[73] Assignee: Graco Inc., Minneapolis, Minn.

[21] Appl. No.: 321,649

[22] Filed: Mar. 10, 1989

[51] Int. Cl.$^4$ .............................................. B60S 5/02
[52] U.S. Cl. .............................. 137/234.6; 137/355.17; 137/362
[58] Field of Search ....................... 184/1.5; 137/234.6, 137/362, 236.1, 355.17

[56] References Cited

U.S. PATENT DOCUMENTS

| | | | |
|---|---|---|---|
| 1,337,408 | 4/1920 | Morris | 137/234.6 |
| 2,002,777 | 5/1935 | Johnson | 137/234.6 |
| 2,430,608 | 11/1947 | Ginter | 137/234.6 |
| 2,659,937 | 11/1953 | Hammer | 137/234.6 |

Primary Examiner—A. Michael Chambers
Attorney, Agent, or Firm—Douglas B. Farrow

[57] ABSTRACT

A reel-less hose dispense console is provided for use in garages having multiple bays. The console is located generally parallel to and between parallel bays and is located over an aperture in the floor which is in turn located above a basement. The hoses are connected to a source of pressurized material in the basement and a loop extends from the ceiling of the basement downwardly and then upwardly throughout the aperture in the floor to the console whereupon it terminates in a dispensing implement such as a nozzle or gun.

4 Claims, 1 Drawing Sheet

U.S. Patent  Dec. 5, 1989  4,884,592
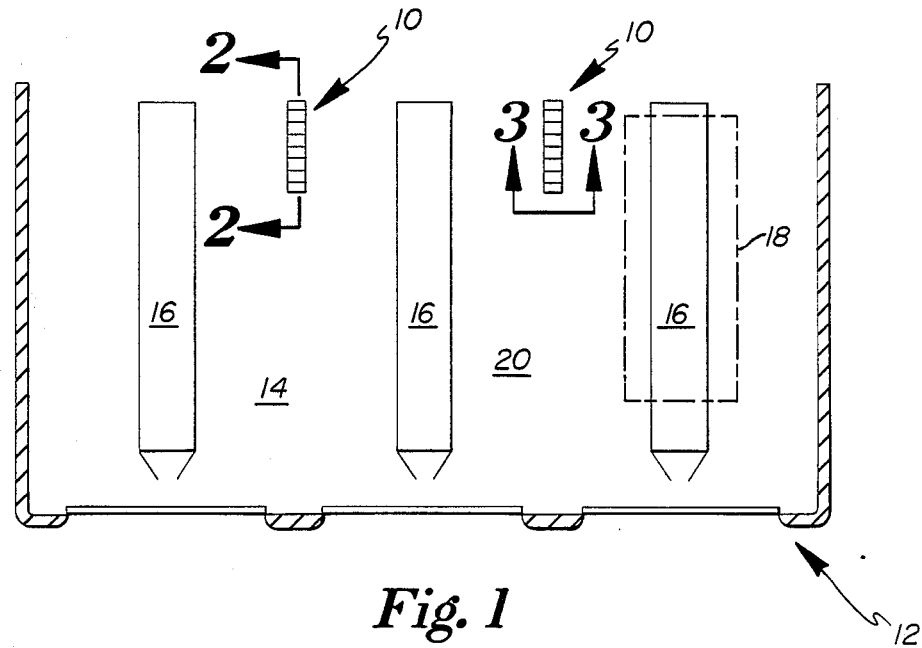
Fig. 1
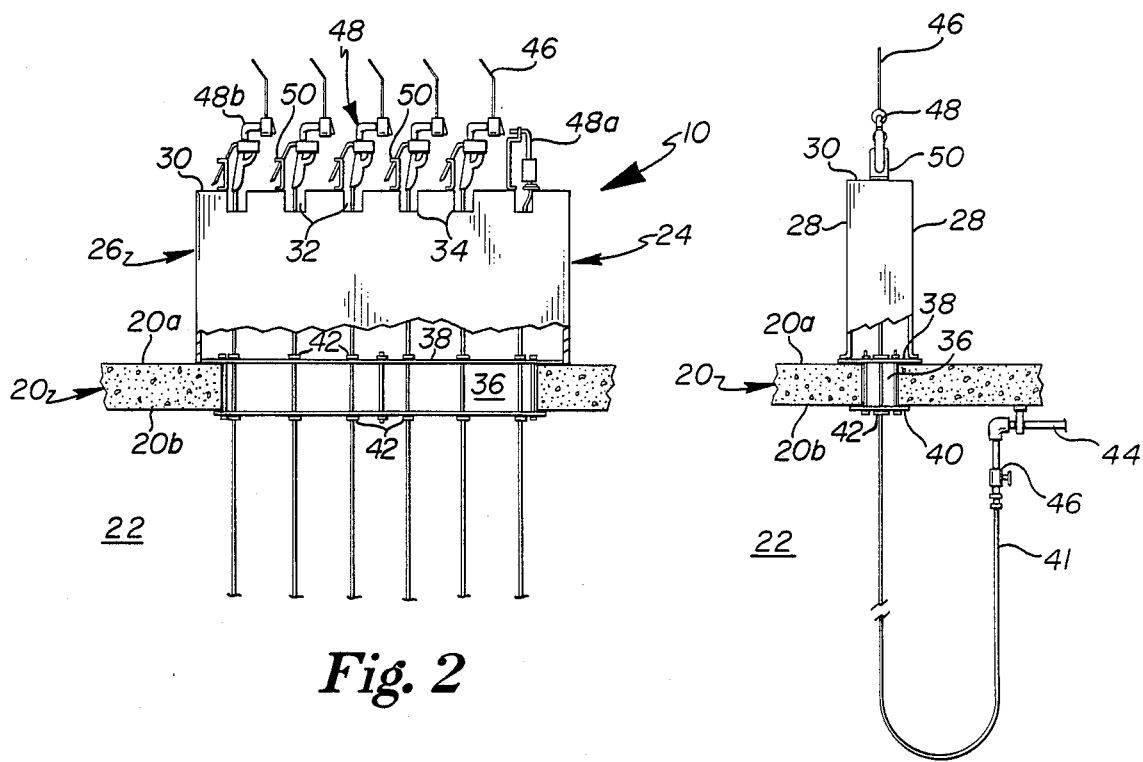
Fig. 2
Fig. 3

REEL-LESS DISPENSE CONSOLE

BACKGROUND OF THE INVENTION

Reel consoles have been used for many, many years in garages and the like for containing hoses and dispensing implements for motor oil, grease and the like. Such consoles have typically been mounted overhead and had retractable reels which contained the length of hoses thereon which could be withdrawn as desired by an operator.

While such devices have served well over the years, with the recent proliferation of fast lubrication operations, there has been an increased desired in the industry to cut the cost of such consoles, particularly through elimination of the relatively expensive and maintenance requiring reel mechanism.

While it has been proposed to place a reel-less console parallel to the front end of the garage bay (the front being where the front end of the car resides as it travels through the bay), such devices have proved less than satisfactory due to the fact that in servicing cars on either side of the device, the hoses for the various fluids and materials being dispensed inevitably become crossed and can become tangled.

It is therefore an object of this invention to provide a dispense console which is easily and inexpensively installed and yet which is efficient in use in installation.

SUMMARY OF THE INVENTION

A typical garage has a number of bays which lie parallel to one another. Located (desirably) between each bay is a dispense console, the dispense console being formed of a generally elongated rectangular cabinet with the elongation axis parallel to and located between the bays or stalls. The rectangular cabinet is located over a rectangular aperture in the floor, the aperture in the floor generally corresponding to the horizontal cross section of the console.

Typically, conductive piping is plumbed to a pump or other source of pressurized material (which can be windshield washer solvent, motor oil, transmission fluid or the like) and which runs along the ceiling of the basement (which is also the bottom of the floor) to a location adjacent the previously referred to aperture. A length of hose in thence attached to the piping, and the hose forms a loop which falls downwardly and then loops upwardly through the aperture and the console whereupon it terminates in a dispensing nozzle or gun.

A plurality of roller guides in plates are provided on the top and bottom surfaces of the floor at the edges of the aperture to guide the hose and prevent abrasion as well as in the top surface of the console which has a plurality of slots through which the hose passes and the dispensing implements rest on when not it use. The various elements in the dispense console are positioned in the order and position of use, i.e., the hose and material which are used closest to the front of the car (windshield washer solvent) are positioned at the front of the console and the material used at the rear-most portion of the car (transmission fluid) is provided the rear-most portion of the console. Other fluids such as various types of motor oil which are used intermediately are positioned in between the two ends.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a plan view of the instant invention as applied in a three bay or stall garage.

FIG. 2 is a sectional view taken along 2—2 of FIG. 1.

FIG. 3 is a sectional view taken along 3—3 of FIG. 1.

DESCRIPTION OF THE PREFERRED EMBODIMENT

The dispense console 10 of the instant invention is designed for use in a garage 12 having a plurality of bays or stalls 14. The embodiment shown in FIG. 1 shows three stalls, each of which has a lift 16 located in the center thereof. A single car 18 is shown in dotted outline in FIG. 1 for purposes of clarification. The garage 12 is provided with a floor 20 having a top surface 20a and a bottom surface 20b. Bottom surface 20b serves as the ceiling of the basement 22 which is located beneath floor 20.

Console 10 is provided with an upstanding front surface 24, a rear surface 26 and two side surfaces 28. Additionally, a top surface 30 is provided with a plurality of slots 32 which extend across the width of top 30 and partially down into each side 28. This configuration allows a fluid to be dispensed from either side at the same time without the hoses becoming crossed and tangled. The portions of the slots 32 in sides 28 are bordered by roller guides 34 which help to guide the hose in a low friction manner and prevent abrasion or other hose damage. Such roller guides are in general well known in the art.

The bottom of console 10 is fastened to the top surface 20a of floor 20 and is located directly over an elongated rectangular aperture 36 which, as can be seen in FIGS. 2 and 3. The upper plate 38 is the same size as the base of console 10, and can also be used as the installation template. The lower guide plate is slightly shorter and narrower than the dimensions of console 10.

Upper and lower guide plates 38 and 40 respectively are sandwiched to the upper and lower surfaces 20a and 20b respectively of floor 20. Guide plates 30 and 40 each have a plurality of roller guides 42 located therein and positioned to vertically correspond with slots 32.

In the plumbing of the operation, piping 44 is connected to a source of pressurized material (not shown) and terminates in a fitting 46 which is in turn connected to hose 40. Hose 40 loops downwardly from fitting 46 and thence upwardly through lower and upper guide plates 40 and 38 respectively and thence through slot 32 at the top of console 10 to terminate in a dispensing implement 48. Dispensing implements 48 may have simple known nozzles or meters thereon depending on the desires of the operator. Dispensing implements 48 may be set on brackets 50 which are fastened to the top surface 30 of console 10.

The forward most dispensing implement 48a is typically connected to a source of windshield washer solvent fluid and is positioned here to correspond with the windshield washer bottle which is typically in the forward most portion of the car. Similarly, rear most dispense element 38b is located at the rear-ward end of console 10 to correspond to the relatively rear-ward position of the transmission and is connected to a source of transmission fluid or the like. The dispense elements 48 in between are connected to other fluids which are used in a vehicle, typically a variety of different grades of motor oil. As can be seed particular in FIG. 3, the weight of the hose 40 hanging in a loop in basement 22 serves to help retract the hose into console 10 when not in use without the use of any expensive spring loaded reels and the like.

It is contemplated that various changes and modifications may be made to the dispense console without departing from the spirit and scope of the invention as defined by the following claims.

What is claimed is:

1. A dispense console in combination with a garage having a floor having top and bottom surfaces, a basement beneath said floor and a plurality of parallel stalls on said floor, said console comprising:
    an elongated housing located on said top surface of said floor and between and parallel to two of said stalls, said housing having a front, a back, a top and a bottom;
    a first set of guide means located in said housing top;
    an aperture in said floor generally coextensive with said housing bottom;
    a second set of guide means attached to said floor; and
    a plurality of flexible hoses, each said hose having a first end attached to a pressurized fluid source in said basement and a second end having a dispensing element, the length of each said hose between said ends being sufficient to form a downward loop from said bottom surface at said floor and thence pass upwardly through said second set of guide means and aperture to said housing top.

2. The dispense console of claim 1 wherein said second set of guide means are attached at said floor bottom surface.

3. The dispense console of claim 2 further comprising a third set of guide means attached to said floor top surface above and aligned with said second set.

4. The dispense console of claim 1 wherein a first said hose is connected to a source of transmission fluid, said first hose being located adjacent said housing back.

* * * * *